(12) United States Patent
Bennett et al.

(10) Patent No.: US 10,007,732 B2
(45) Date of Patent: Jun. 26, 2018

(54) RANKING CONTENT ITEMS BASED ON PREFERENCE SCORES

(71) Applicant: Microsoft Technology Licensing, LLC, Redmond, WA (US)

(72) Inventors: Paul Bennett, Redmond, WA (US); Milad Shokouhi, Cambridge (GB); Richard A. Caruana, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 275 days.

(21) Appl. No.: 14/715,852

(22) Filed: May 19, 2015

(65) Prior Publication Data

US 2016/0342692 A1   Nov. 24, 2016

(51) Int. Cl.
*G06F 17/30* (2006.01)

(52) U.S. Cl.
CPC .... *G06F 17/30867* (2013.01); *G06F 17/3053* (2013.01)

(58) Field of Classification Search
CPC .................................. G06F 17/30867
USPC .................................. 707/730, 708
See application file for complete search history.

(56) References Cited

U.S. PATENT DOCUMENTS

| | | | |
|---|---|---|---|
| 8,117,197 B1 * | 2/2012 | Cramer | G06F 17/30702 706/12 |
| 8,126,894 B2 * | 2/2012 | Liu | G06F 17/30864 707/738 |
| 8,150,839 B2 | 4/2012 | Choi et al. | |
| 8,166,026 B1 * | 4/2012 | Sadler | G06F 17/30867 707/722 |
| 8,312,009 B1 * | 11/2012 | Bostock | G06F 17/30867 707/723 |
| 8,538,959 B2 | 9/2013 | Jin et al. | |
| 2009/0106221 A1 | 4/2009 | Meyerzon et al. | |
| 2010/0153370 A1 | 6/2010 | Gollapudi et al. | |
| 2010/0318531 A1 | 12/2010 | Gao et al. | |
| 2011/0270828 A1 | 11/2011 | Varma et al. | |
| 2012/0185359 A1 | 7/2012 | Chen et al. | |
| 2013/0151495 A1 | 6/2013 | Bennett et al. | |
| 2013/0246383 A1 | 9/2013 | White et al. | |

(Continued)

OTHER PUBLICATIONS

Agichtein, et al., "Improving Web Search Ranking by Incorporating user Behavior Information", In Proceedings of the 29th annual international ACM SIGIR conference on Research and development in information retrieval, Aug. 6, 2008, pp. 19-26.

(Continued)

*Primary Examiner* — Chelcie Daye
(74) *Attorney, Agent, or Firm* — Jonathan M. Waldman

(57) ABSTRACT

A set of content items, such as web pages, are identified in response to a query generated by a user. The Identified content items are initially ranked using a ranking scheme. User-interaction data that describes preferences that the user may have towards some of the ranked content items is received. In order to personalize the ranking of the content items for the user, the user-interaction data is used to re-rank the ranked content items in a way that favors content items that are preferred by the user, while also preserving the initial broadly applicable ranking with respect to content items that are not preferred or that are equally preferred by the user.

19 Claims, 5 Drawing Sheets

(56) References Cited

U.S. PATENT DOCUMENTS

| | | | |
|---|---|---|---|
| 2013/0246412 A1* | 9/2013 | Shokouhi | G06F 17/30867 707/730 |
| 2014/0122475 A1 | 5/2014 | Li et al. | |
| 2014/0149429 A1 | 5/2014 | Gao et al. | |

OTHER PUBLICATIONS

Agichtein, et al., "Learning user Interaction Models for Predicting Web Search Result Preferences", In Proceedings of the 29th annual international ACM SIGIR conference on Research and development in information retrieval, Aug. 6, 2008, pp. 3-10.

Bennett, et al., "Modeling the Impact of Short- and Long-term Behavior on Search Personalization", In Proceedings of the 35th international ACM SIGIR conference on Research and development in information retrieval, Aug. 12, 2012, pp. 185-194.

Bennett, et al.,"Inferring and using Location Metadata to Personalize Web Search", In Proceedings of the 34th international ACM SIGIR conference on Research and development in Information Retrieval, Jul. 24, 2011, pp. 135-144.

Burges, et al., "Learning to Rank with Non-Smooth Cost Functions", In Advances in Neural Information Processing Systems, Dec. 4, 2006, 8 pages.

Burges, et al., "Learning to Rank using an Ensemble of Lambda-Gradient Models", In Journal of Machine Learning Research, vol. 14, Feb. 2011, pp. 25-35.

Carterette, et al., "Learning a Ranking from Pairwise Preferences", In Proceedings of the 29th annual international ACM SIGIR conference on Research and development in information retrieval, Aug. 6, 2006, 2 pages.

Chapelle, at el., "A Dynamic Bayesian Network Click Model for Web Search Ranking", In Proceedings of the 18th international conference on World Wide Web, Apr. 20, 2009, pp. 1-10.

Chuklin, et al., "Click Model-based Information Retrieval Metrics", In Proceedings of the 36th international ACM SIGIR conference on Research and development in information retrieval, Jul. 28, 2013, pp. 493-502.

Kevyn, Collins-Thompson, "Reducing the Risk of Query Expansion via Robust Constrained Optimization", In Proceedings of the 18th ACM conference on Information and knowledge management, Nov. 2, 2009, pp. 837-846.

Collins-Thompson, et al., "TREC 2013 Web Track Overview", In Proceedings of the Twenty-Second Text Retrieval Conference, Nov. 2013, pp. 1-15.

Craswell, et al., "An Experimental Comparison of Click Position-Bias Models", In Proceedings of the International Conference on Web Search and Data Mining, Feb. 11, 2008, pp. 87-94.

Dincer, et al., "Hypothesis Testing for the Risk-Sensitive Evaluation of Retrieval Systems", In Proceedings of the 37th International ACM SIGIR conference on Research & Development in Information Retrieval, Jul. 6, 2014, pp. 23-32.

Dong, et al., "Time is of the Essence: Improving Recency Ranking using Twitter Data", In Proceedings of the 19th international conference on World Wide Web, Apr. 26, 2010, pp. 331-340.

Dupret, et al., "A User Browsing Model to Predict Search Engine Click Data from Past Observations", In Proceedings of the 31st annual international ACM SIGIR conference on Research and development in information retrieval, Jul. 20, 2008, pp. 331-338.

Fang, et al., "An Exploration of Axiomatic Approaches to Information Retrieval", In Proceedings of the 28th annual international ACM SIGIR conference on Research and development in information retrieval, Aug. 15, 2005, pp. 480-487.

Fang, et al., "Semantic Term Matching in Axiomatic Approaches to Information Retrieval", In Proceedings of the 29th Annual International ACM SIGIR Conference on Research and Development in Information Retrieval, Aug. 6, 2006, pp. 115-122.

Fox, et al., "Evaluating Implicit Measures to Improve Web Search", In Journal of ACM Transactions on Information Systems, vol. 23, Issue 2, Apr. 2005 22 pages.

Gollapudi, et el., "An Axiomatic Approach for Result Diversification", In Proceedings of the 18th international conference on World Wide Web, Apr. 20, 2005, pp. 381-390.

Guo, et al., "Click Chain Model in Web Search", In Proceedings of the 18th international conference on World Wide Web, Apr. 20, 2005, pp. 11-20.

Hullermeier, et al., "Label Ranking by Learning Pairwise Preferences", In Journal of Artificial Intelligence, vol. 172, Issue 16-17, Nov. 1, 2008, pp. 1-37.

Jarvelin, et al., "Cumulated Gain-Based Evaluation of IR Techniques", In Journal of ACM Transactions on Information Systems, vol. 20, Issue 4, Oct. 1, 2002, pp. 422-446.

Joachims, Thorsten, "Optimizing Search Engines using Clickthrough Data", In Proceedings of the eighth ACM SIGKDD international conference on Knowledge discovery and data mining, Jul. 23, 2002, 10 pages.

Joachims, et al., "Evaluating the Accuracy of Implicit Feedback from Clicks and Query Reformulations in Web Search", In Proceedings of ACM Transactions on Information Systems vol. 25, Issue 2, Apr. 1, 2007, pp. 1-26.

Liu Tie-Yan, "Learning to Rank for Information Retrieval", In Journal of Foundations and Trends in Information Retrieval, vol. 3, Issue 3, Mar. 1, 2009, 131 pages.

Radlinski, et al., "Query Chains: Learning to Rank from Implicit Feedback", In Proceedings of the eleventh ACM SIGKDD international conference on Knowledge discovery and data mining, Aug. 11, 2005, 10 pages.

Radlinski, et al., "How Does Clickthrough Data Reflect Retrieval Quality?", In Proceedings of the 17th ACM conference on Information and knowledge management, Oct. 26, 2008, 10 pages.

Raman, et al., "Stable Coactive Learning via Perturbation", In Proceedings of the 30th International Conference on Machine Learning, vol. 28, Jun. 16, 2013, 9 pages.

Shen, et al., "Context-Sensitive Information Retrieval Using Implicit Feedback", In Proceedings of the 28th annual international ACM SIGIR conference on Research and development in information retrieval, Aug. 15, 2005, pp. 43-50.

Shivaswamy, et al., "Online Structured Prediction via Coactive Learning", In Proceedings of the 129th International Conference on Machine Learning, Jun. 26, 2012, 8 pages.

Shokouhi, Milad, "Learning to Personalize Query Auto-Completion", In Proceedings of the 36th international ACM SIGIR conference on Research and development in information retrieval, Jul. 28, 2013, 10 pages.

Shokouhi, et al., "Fighting Search Engine Amnesia: Reranking Repeated Results", In Proceedings of the 36th international ACM SIGIR conference on Research and development in information retrieval, Jul. 28, 2013, 10 pages.

Sieg, et al., "Web Search Personalization with Ontological User Profiles", In Proceedings of the sixteenth ACM conference on information and knowledge management, Nov. 6, 2007, 10 pages.

Svore, et al., "Learning to Rank with Multiple Objective Functions", In Proceedings of the 20th international conference on World Wide Web, Mar. 28, 2011, 10 pages.

Tan, at al., "Mining Long-Term Search History to Improve Search Accuracy", In Proceedings of the 12th ACM SIGKDD international conference on Knowledge discovery and data mining, Aug. 20, 2006, pp. 718-723.

Teevan, et al., "To Personalize or Not to Personalize: Modeling Queries with Variation in User Intent", In Proceedings of the 31st annual international ACM SIGIR conference on Research and development in information retrieval, Jul. 20, 2008, 8 pages.

Teevan, et al., "Understanding and Predicting Personal Navigation", In Proceedings of the fourth ACM international conference on Web search and data mining, Feb. 9, 2011, 10 pages.

Ustinovskiy, et al., "Personalization of Web-search Using Short-term Browsing Context", In Proceedings of the 22nd ACM international conference on Conference on information & knowledge management, Oct. 27, 2013, pp. 1979-1988.

Wang, et al., "Robust Ranking Models via Risk-Sensitive Optimization", In Proceedings of the 35th international ACM SIGIR conference on Research and development in information retrieval, Aug. 12, 2012, 10 pages.

(56) References Cited

OTHER PUBLICATIONS

Wu, et al., "Adapting Boosting for Information Retrieval Measures", In Journal of Information Retrieval, vol. 13, Issue 3, Jun. 1, 2010, pp. 1-17.

Xiang, et al., "Context-Aware Ranking in Web Search", In Proceedings of the 33rd international ACM SIGIR conference on Research and development in information retrieval, Jul. 19, 2010, 8 pages.

Sivagami, et al., "Ontology Based Mobile Retrieval Using Clickthrough Data", In International Journal of Engineering Research & Technology, vol. 2, Issue 12, Dec. 25, 2013, pp. 2661-2666.

Huang, et al., "No Clicks, No Problem: Using Cursor Movements to Understand and Improve Search", In Proceedings of the SIGCHI Conference on Human Factors in Computing Systems, May 7, 2011, 10 pages.

Dou, et al., "Are Click-through Data Adequate for Learning Web Search Rankings?", In Proceedings of 17th ACM Conference on Information and Knowledge Management, Oct. 26, 2008, pp. 73-82.

Leung, et al., "A Framework for Personalizing Web Search with Concept-Based User Profiles", In Journal of ACM Transactions on Internet Technology, vol. 2, No. 3, Sep. 2001, pp. 112-137.

Cheng, et al., "Personalized Click Prediction in Sponsored Search", In Proceedings of Third ACM International Conference on Web Search and Data Mining, Feb. 4, 2010, pp. 351-359.

Song, et al., "Context-Aware Web Search Abandonment Prediction", In Proceedings of 37th Annual ACM Special Interest Group on Information Retrieval Conference, Jul. 6, 2014, 10 pages.

Yi, et al., "Beyond Clicks: Dwell Time for Personalization", In Proceedings of 8th ACM Conference on Recommender Systems, Oct. 6, 2014, 8 pages.

Elbassuoni, et al., "Adaptive Personalization of Web Search", In Proceedings of 1st Workshop on Web Information-Seeking and Interaction, Jul. 27, 2007, pp. 1-6.

\* cited by examiner

RANKING CONTENT ITEMS BASED ON PREFERENCE SCORES

BACKGROUND

User-interaction data collected when a user interacts with content items can be used to create personalized content item ranking models for the user. For example, where the content items are web pages, user-interaction data such as clicks and dwell times can be collected and used to generate a personalized model that can predict which web pages that a user is likely to be interested in from a set of search results. The model can be used to rank or order the web pages in search results for the user.

While such personalized models are useful, there are drawbacks associated with personalized models. One drawback is that personalized models may over-fit user-interaction data onto a ranking of web pages, even where there is no gain over a more global or broadly applicable model. For example, where there is little user-interaction data regarding a particular set of web pages, the personalized model may give too much positive weight to the web pages associated with the user-interaction data in the ranking, and may give too much negative weight to the web pages without any associated user-interaction data in the ranking. The resulting ranking may lead to a poor search experience for the user.

SUMMARY

A set of content items, such as web pages, are identified in response to a query generated by a user. The identified content items are initially ranked using a broadly applicable ranking scheme. User-interaction data that describes preferences that the user may have towards some of the ranked content items is received. To personalize the ranking of the content items for the user, the user-interaction data is used to re-rank the ranked content items in a way that favors content items that are preferred by the user, while also preserving the initial broadly applicable ranking with respect to content items that are not preferred or that are equally preferred by the user. By using user-interaction data to re-rank content items, while preserving the original ranking where no user preferences are shown, the overall search experience of the user may be increased.

In an implementation, identifiers of a plurality of content items are received by a computing device. Each content item has a position in a first order of the plurality of content items. Content items from the plurality of content items that are relevant content items are determined by the computing device. Ranking preference data comprising a first parameter and a second parameter is received by the computing device. The first parameter indicates a preference of the user for content items that are relevant content items and the second parameter indicates a preference of the user to maintain the first order. A second order for the plurality of content items is generated using the ranking preference data by the computing device. Each content item has a position in the second order.

In an implementation, identifiers of a plurality of content items are received by a computing device. Each content item has a position in a first order of the plurality of content items. User-interaction data associated with a user and one or more of the plurality of content items is received by the computing device. Content items from the plurality of content items that are relevant content items are determined based on the user-interaction data by the computing device. Content items from the plurality of content items that are irrelevant content items are determined based on the user-interaction data by the computing device. Ranking preference data associated with the user is received by the computing device. A second order for the plurality of content items is determined based on the determined content items that are relevant content items, the determined content items that are irrelevant content items, and the ranking preference data. Each content item has a position in the second order.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
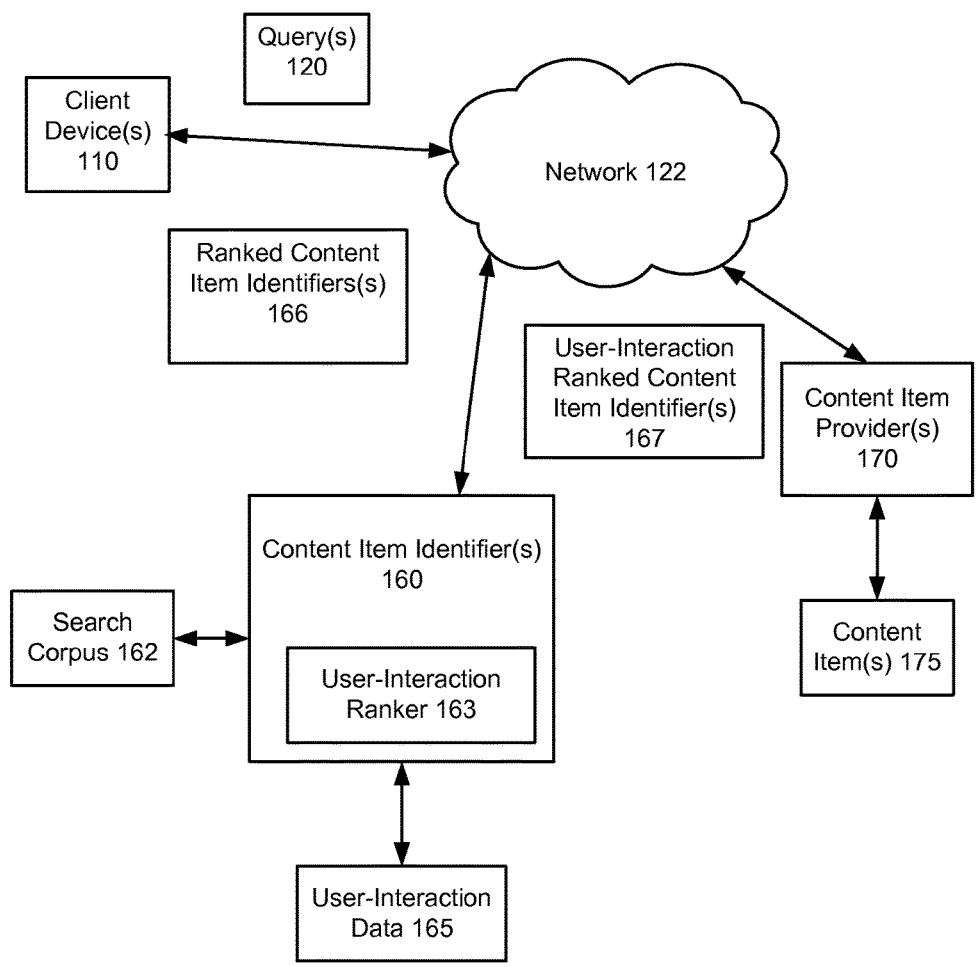
FIG. 1 is an illustration of an exemplary environment for ranking content items based on user-interaction data.

FIG. 1 is an illustration of an exemplary environment 100 for ranking content items based on user-interaction data. The environment 100 may include a client device 110, content item identifier 160, and a content item provider 170 in communication through a network 122. The network 122 may be a variety of network types including the public switched telephone network (PSTN), a cellular telephone network, and a packet switched network (e.g., the Internet). Although only one client device 110, one content item identifier 160, and one content item provider 170 are shown in FIG. 1, there is no limit to the number of client devices 110, content item identifiers 160, and content item providers 170 that may be supported.

Figure 5:
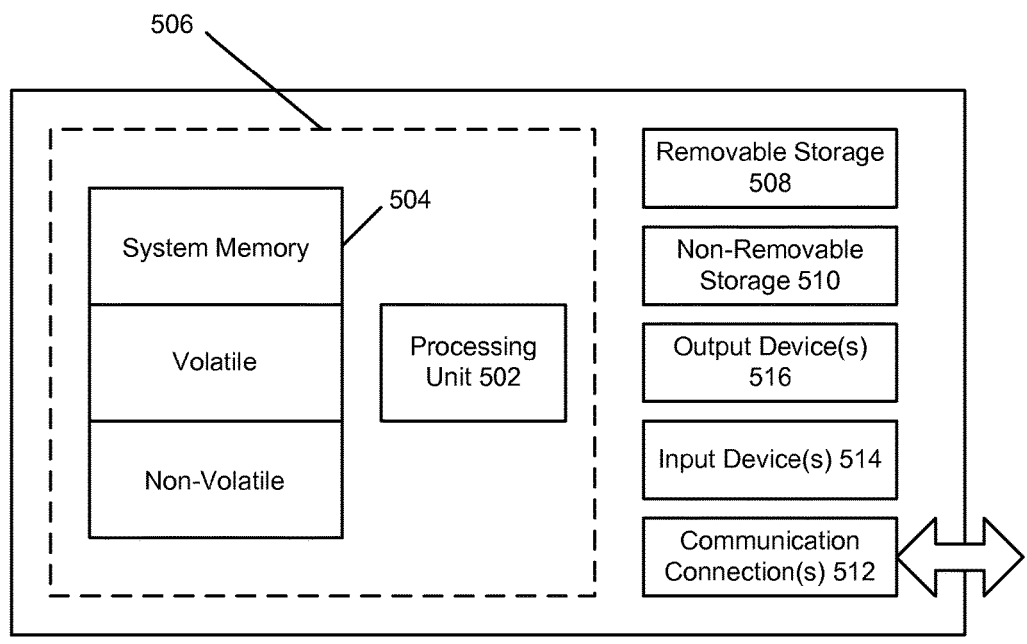
FIG. 5 shows an exemplary computing environment in which example embodiments and aspects may be implemented.

The client device 110, the content item identifier 160, and the content item provider 170 may be implemented together or separately using a general purpose computing device such as is the computing device 500 described with respect to FIG. 5. The client device 110 may be a smart phone, video game console, laptop computer, set-top box, personal/digital video recorder, or any other type of computing device.

The content item provider 170 may provide one or more content items 175 to the client device 110. The content items 175 may include web pages, images, videos, e-books, video games, advertisements, or any other types of content files. In one implementation, the content item provider 170 may be a web server and may provide content items 175 that are web pages.

The client device 110 may generate one or more query(s) 120. A query 120 may include terms or keywords that may indicate the type or content of content items 175 that a user associated with the client device 110 is interested in is receiving. The queries 120 may be generated by an application executed by the client device 110 such as a web browser. Other types of applications may be supported and may depend on the type of content items 175 that the user is interested in. For example, where the content items 175 are posts in a social network, the user may use a social networking application to generate the query 120.

In some implementations, the client device 110 may provide the query 120 to the content item provider 170. Alternatively, because there may be a large number of content item providers 170, the client device 110 may provide the query 120 to a content item identifier 160. The content item identifier 160 may be configured to identify content items 175 available across multiple content item providers 170 in response to received queries 120. In some implementations, the content item identifier 160 may fulfill the received queries 120 using data stored in a search corpus 162. The search corpus 162 may comprise an index of the content items 175 available at each of the content item providers 170 along with text from the content items 175, keywords associated with the content items 175, and/or metadata associated with the content items 175. One example of a content item identifier 160 may be a search engine.

The content item identifier 160 may fulfill a received query 120 by searching the search corpus 162 for content items 175 that are likely to be responsive the query 120. For example, the content item identifier 160 may match terms of the query 120 with the keywords, text, or metadata associated with the content items 175. Identifiers of the matching content items 175 may be provided to the client 110 in response to the query 120. The identifiers of the matching content items 175 may include universal resource locators ("URLs"). Other types of identifiers may be used.

Because there may be many content items 175 that match a query 120, the content item identifier 160 may further rank the matching content items 175. One way the content items 175 may be ranked is based on how responsive they are to the query 120. For example, the content items 175 may be ranked based on the number of terms of the query 120 that appear in the content items 175, or the overall popularity of the content items 175. Any method for ranking content items 175 may be used. The ranked identifiers of the matching content items 175 may be provided to the user of the client device 110 as the ranked content item identifiers 166.

Typically, each of the content items 175 identified by the ranked content item identifiers 166 may be associated with a position in a ranked order. The identifier in the first or top position identifies the highest ranked content item, while the identifier in the last or bottom position identifies the lowest ranked content item. For example, where the content items 175 are web pages, the ranked content item identifiers 166 may be presented to a user as a set of search results. The web page identified at the top position in the search results has been determined to be the most relevant web page, while the web page identified at the bottom of the search results has been determined to be the least relevant web page.

While the ranking of content items 175 provided by the content item identifier 160 is broadly applicable to a large number of users, the ranking may fail to consider user-specific signals or data that can be used to personalize the ranking for each individual user. Accordingly, the content item identifier 160 may further include a user-interaction ranker 163 that re-ranks or adjusts the order of the content items 175 in the ranked content item identifiers 166 based on user-interaction data 165 associated with the particular user that generated the original query 120. Alternatively, the user-interaction data 165 may be associated with multiple users, or with a particular class of users. While shown as part of the content item identifier 160, the user-interaction ranker 163 may also be integrated into the client device 110 associated with the user as part of a web browser or other application, for example.

The user-interaction data 165 may include data that is collected about each user that indicates the particular content items 175 that the user is interested in. The user-interaction data 165 may be query-specific, and may indicate the particular content items 175 that were indicated to the user in response to a query 120 along with which of the content items 175 that the user was satisfied with (or was dissatisfied with).

Where the content items 175 are web pages, the user-interaction data 165 may include a variety of metrics such as which web pages the user clicked on or selected for each query 120 (i.e., click data), and how long the user remained at each web page (i.e., dwell time). Depending on the implementation, the user-interaction data 165 may indicate for each query 120 the set of web pages that were determined to be relevant to the user for the query 120, and the set of web pages that were considered irrelevant to the user for the query 120. A content item 175 or web page may be considered relevant if it was clicked on by the user and/or the dwell time for that web page exceeds a threshold. Similarly, a content item 175 that was not selected or that has a dwell time that is below the threshold may be considered irrelevant.

Where the content items 175 are web pages, when an indicated web page presented in response to a query 120 is selected or clicked on and its associated dwell time exceeds a threshold, the selected web page may be considered to be relevant to the query 120. In addition, all of the indicated web pages that have positions that are above the selected web page, that were either not selected or that have associated dwell times that are below the threshold, may be considered to be irrelevant to the query 120. The assumption is that users view search results by starting at the top most position and working their way to the bottom most position. Therefore, any web page that was not selected with a position that is greater than the position of the selected web page may be deemed to have been considered and deemed to have been irrelevant by the user.

Depending on the implementation, those web pages that were not selected or that have associated dwell times that are below the threshold with positions that are below the selected web page may also be considered to be irrelevant, or may be considered to be neither relevant nor irrelevant. In some implementation, the non-selected web pages that lie within a threshold number of position below the selected web page may be considered irrelevant. For example, users may also consider web pages in the positions directly below the selected web page before ultimately clicking on the selected web page. The threshold may be set by a user or an administrator.

The user-interaction ranker 163 may re-rank the ranked content item identifiers 166 using the user-interaction data 165 to generate the user-interaction ranked content item identifiers 167. In order to avoid the drawbacks associated with personalized rankings such as re-ranking content items 175 that have no associated user-interaction data 165, the user-interaction ranker 163 may re-rank the ranked content item identifiers 166 in a way that balances a desire to promote content items 175 with positive user-interaction data 165, with a desire to maintain the original ranking where there is no clear preference shown in the user-interaction data 165. By using user-interaction data 165 to re-rank content item identifiers 166, while preserving the original ranking where no user preference is shown, the overall search experience of the user may be increased.

Figure 2:
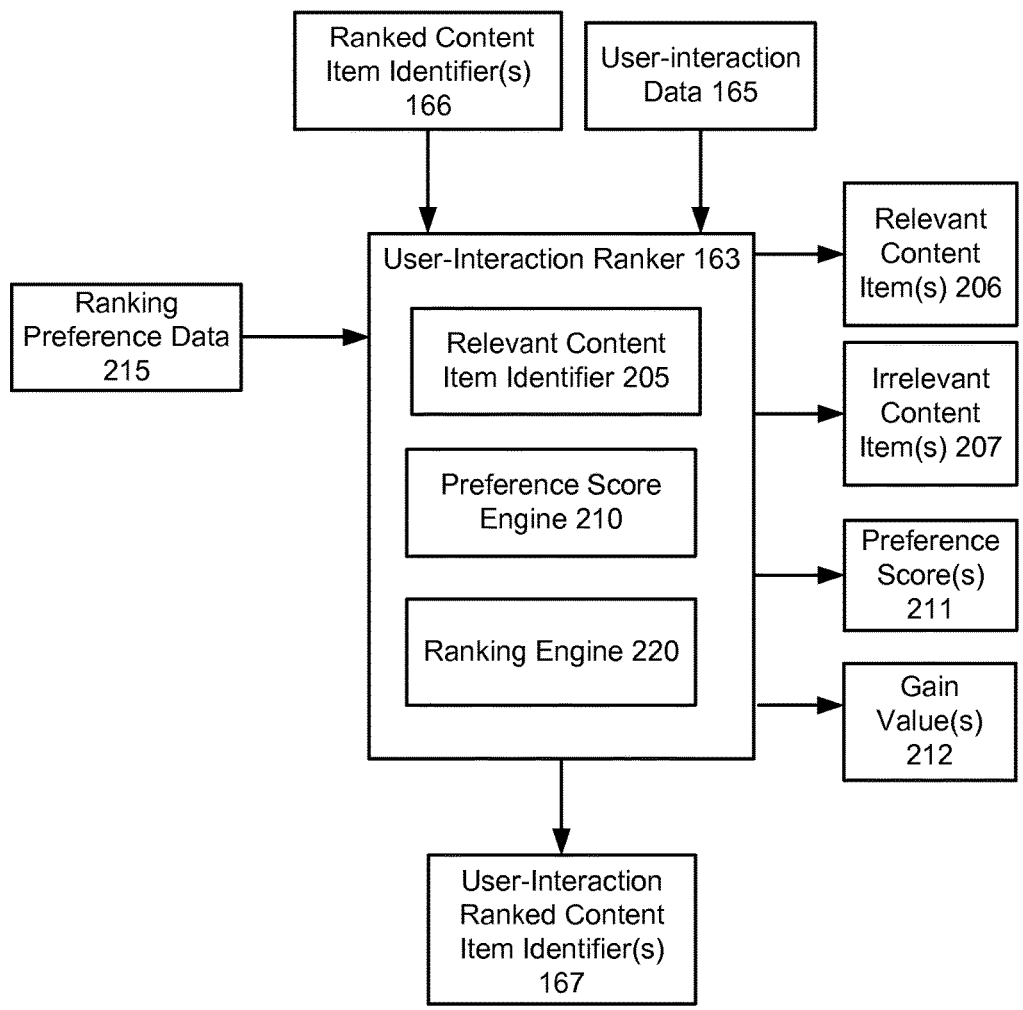
FIG. 2 is an illustration of an example user-interaction ranker.

As described further with respect to FIG. 2, the user-interaction ranker 163 may re-rank the ranked content item identifiers 166 based on two general principles. The first principle is that any content item 175 that is determined to be relevant based on the user-interaction data 165 may receive a higher priority in the new ranking than a content item 175 that is determined to be irrelevant based on the user-interaction data 165. The second principle is that for any two content items 175 that have been determined to be in the same class based on the user-interaction data 165 (i.e., relevant or irrelevant) the preference or priority for those content items 175 may remain the same as the original ranking from the ranked content item identifiers 166.

As may be appreciated, the first principle reflects the desire to rank content items 175 high when a clear signal exists in the user-interaction data 165 that the user was previously satisfied with that content item 175. The second principle reflects the desire to leave the original ranking the same in cases where the user-interaction data 165 indicates that the user found both content items 175 either relevant or irrelevant.

FIG. 2 is an illustration of an example user-interaction ranker 163. As shown, the user-interaction ranker 163 includes one or more components including a relevant content item identifier 205, a preference score engine 210, and a ranking engine 220. More or fewer components may be supported. The user-interaction ranker 163, and each of the one or more components, may be implemented together or separately using a computing device such as the computing device 500 illustrated with respect to FIG. 5.

As described above, the user-interaction ranker 163 may receive ranked content item identifiers 166. The ranked content item identifiers 166 may be in an order where each content item identifier has a position in the order. The ranked content item identifiers 166 may have been ranked by the content item identifier 160 using a global or broadly applicable ranking method. The user-interaction ranker 163 may re-order some or all of the content items 175 identified by the ranked content item identifiers 166 to generate a user-interaction ranked content item identifiers 167 based on user-interaction data 165 associated with the user that requested the ranked content item identifiers 166. The user-interaction ranked content item identifiers 167 may include identifiers of the same content items 175 that were identified in the ranked content item identifiers 166, but the identifiers may have positions in a different order than in the ranked content item identifiers 166.

To facilitate the re-ranking based on user-interaction data 165, the user-interaction ranker 163 may include the relevant content item identifier 205. The relevant content item identifier 205 may use the user-interaction data 165 to classify some or all of the content items 175 identified by the ranked content item identifiers 166 as either a relevant content item 206, or an irrelevant content item 207.

Depending on the implementation, a content item 175 is relevant if it is associated with a positive signal in the user-interaction data 165. Where the content items 175 are web pages, a positive signal may be an indication that the user clicked on a link to the web page or that the user had a dwell time with respect to the web page that exceeded a threshold. Other types of positive signals may be used. Depending on the implementation, the relevant content item identifier 205 may consider all positive signals with respect to a particular content item 175, or may only consider positive signals for content items 175 that are also associated with the same query 120 that the ranked content item identifiers 166 were generated in response to.

A content item 175 may be considered irrelevant if there are negative signals associated with a content item 175. A negative signal may indicate that the user previously considered the content item 175, but found it inadequate. Where the content items 175 are web pages, a negative signal for a content item 175 may be that its identifier was in a position above a position associated with a content item identifier that was clicked on or selected by a user. In addition, content item identifiers that have positions that are up to some number of positions below the position associated with the content item identifier that was clicked on or selected by the user may also be considered irrelevant.

Depending on the implementation, content items 175 that have no positive or negative signals associated with them in the user-interaction data 165 may be considered to be irrelevant.

The preference score engine 210 may compute a preference score 211 for each unique pair of content items 175 identified in the ranked content item identifiers 166. The preference score 211 for two content items of a pair of content items may indicate the preference for the first content item of the pair over the second content item of the pair. A positive preference score 211 may indicate that the user would prefer that the first content item to be ranked higher than the second content item.

The preference score engine 210 may compute the preference scores 211 for pairs of content items 175 using ranking preference data 215. The ranking preference data 215 may include two or more values or parameters. The first value α may represent the overall importance of the first principle in determining the order for user-interaction ranked content item identifiers 167. As described above, the first principle reflects the desire to rank content items 175 high when a clear signal exists in the user-interaction data 165 that the user was previously satisfied with that content item 175.

The second value β may represent the overall importance of the second principle in determining the user-interaction ranked content item identifiers 167. As described above, the second principle reflects the desire to leave the original ranking the same in cases where the user-interaction data 165 indicates that the user found both content items 175 either relevant or irrelevant.

Other types of values may be part of the ranking preference data 215. For example, the ranking preference data 215 may include a value that represents a desire to rank content items 175 based on user-interaction data 165 associated with a different user or a particular class of users (e.g., users having a particular demographic profile). In addition, in some implementations, one of the values of α and β may be fixed, and only the non-fixed value may be adjusted or may be part of the ranking preference data 215.

Depending on the implementation, the values of α and β may be between 0 and 1, however other values or ranges of values may be used. The ranking preference data 215 may be specified by a user or an administrator, for example. For example, a user may specify the relative importance or weight that should be associated with each of the first and the second principles in a setting associated with a web browser or other application. Alternatively, the particular values of α and β may be determined experimentally.

Depending on the implementation, rather than two parameters for the ranking preference data 215, the ranking preference data 215 may include a single value that represents both the first principle and the second principle. For example, the value may be a value between 0 and 1, where 0 represents a complete focus on the first principle and 1 represents a complete focus on the second principle. A value of 0.5 may represent a balance between the first principle and the second principle.

For purposes of calculating the preference scores 211 using the ranking preference data 215, the following notation is used. The set of content items 175 identified by the ranked content item identifiers 166 is referred to as D. The order or ranking of the content items 175 in D is referred to as π. A content item 175 $d_i$ in D being ranked or ordered higher than a content item 175 $d_j$ in D the ranking π is denoted as $d_i >_\pi d_j$ (where i and j are indices of the content items 175 in D). The set of relevant content items 206 is denoted as R and the set of irrelevant content items 207 is denoted as I.

The preference score engine 210 may calculate the preference score 211 for each possible combination of $d_i$ and $d_j$ in D (i.e., pref $(d_i > d_j)$) using the following equation 1:

When $d_i \in R$: (1)

$$pref(d_i \succ d_j) = \begin{cases} \beta & d_j \in R, d_i \succ_\pi d_j \\ 0 & d_j \in R, d_i \prec_\pi d_j \\ \alpha & d_j \in I \end{cases}$$

When $d_i \in I$:

$$pref(d_i \succ d_j) = \begin{cases} 0 & d_j \in I, d_i \prec_\pi d_j \\ \beta & d_j \in I, d_i \succ_\pi d_j \\ 0 & d_j \in R \end{cases}$$

The ranking engine 220 may re-rank the ranked content item identifiers 166 based on the preference scores 211 computed for each of the content items 175 identified in the ranked content item identifiers 166. In some implementations, the ranking engine 220 may perform the re-ranking by using the preference scores 211 to compute a gain value 212 for each indicated content item 175. The indicated content items 175 may be re-ranked according to the computed gain values 212, and provided by the ranking engine 220 as the user-interaction ranked content item identifiers 167.

In some implementations, the gain value 212 for an indicated content item 175 $d_i$ can be computed as the sum of all of the preference scores 211 computed for the content item 175 $d_i$ with respect to each of the other content items 175 in D. Such a method is reflected in the following equation 2 where G $(d_i)$ is the gain value computed for $d_i$.

$$G(d_i) = \Sigma d_j \in D, d_j \neq d_i pref(d_i > d_j) \quad (2)$$

The ranking engine 220 may re-rank the ranked content-item identifiers 166 using the computed gain values 212. In some implementations, the ranking engine 220 may re-rank by assigning the content item identifiers positions based on their computed gain values 212. For example, the content item identifier from the ranked content-item identifiers 166 with the greatest computed gain value 212 may receive the best or top most position in the user-interaction ranked content item identifiers 167, and the content item identifier with the lowest computed gain value 212 may receive the lowest position in the user-interaction ranked content item identifiers 167.

In some implementations, the ranking engine 220 may rank the content-item identifiers 166 using a ranking model. The ranking model may be used by the ranking engine 220 to re-rank the ranked content item identifiers 166 when no, or very little, user-interaction data 165 is available. The ranking model may take as an input the ranked content item identifiers 166 and the ranking preference data 215, and may output the set of preference scores 211. The preference scores 211 may be used by the ranking engine 220 to re-rank the ranked content item identifiers 166 as described above.

Depending on the implementation, the ranking model may be trained by the ranking engine 220 to predict preference scores 211 using previously re-ranked ranked content item identifiers 166 for the user based on the user-interaction data 165 and the ranking preference data 215. Alternatively or additionally, the ranking model may be trained directly from the user-interaction data 165 and the ranking preference data 215.

Table 1 is an illustration of how the computed gain values 212 can be used to re-rank content item identifiers where the content items 175 are web pages. As shown, the column labeled "Title" of the Table 1 includes the titles of each of a plurality of content items 175 that were initially provided in response to a query 120 of "ACL" that was submitted by a user. The titles in the Table 1 may correspond to each of the indicators of the ranked content item identifiers 166 provided by the content item identifier 160. The column labeled "Order" of the Table 1 shows the positions of each content item 175 in the order in which they were initially ranked in the ranked content item identifiers 166.

TABLE 1

| Order | Title | Relevant | Order X | Order Y | Gain X | Gain Y |
|---|---|---|---|---|---|---|
| 1 | Anterior Cruciate Ligament | No | 2 | 6 | 4 | .4 |
| 2 | Austin City Limits Festival | No | 3 | 5 | 3.5 | .35 |
| 3 | ACL compliance Software | No | 4 | 4 | 3 | .3 |
| 4 | Anterior Cruciate Ligament Injuries | No | 5 | 3 | 2.5 | .25 |
| 5 | Access Control List | No | 6 | 2 | 2.0 | .2 |
| 6 | Association for Computational Linguistics | Yes | 1 | 1 | 9 | 9 |
| 7 | Association of Christian Libraries | No | 7 | 7 | 1.5 | .15 |
| 8 | Administration for Community Living | No | 8 | 8 | 1 | .1 |
| 9 | ACL Cargo | No | 9 | 9 | 0.5 | .05 |
| 10 | ACL Live | No | 10 | 10 | 0 | 0 |

The values in the column labeled "Relevant" represent whether or not the particular content item 175 is part of the relevant content items 206. In the example shown, only the content item with the title "Association for Computational Linguistics" was deemed by the relevant content item identifier 205 to be a relevant content item 206, while the rest of the content items were deemed to be irrelevant content item identifiers 207. The content item titled "Association for Computational Linguistics" may have been previously viewed or selected by the user as indicated by the user-interaction data 165.

The columns labeled "Order X" and "Order Y" show the positions of each content item for two different proposed re-orderings of the content items 175. The order X is a re-ordering that emphasizes relevant content items 206, while also preserving the initial ordering where there is no user-interaction data about a particular content item 175. The order Y is a re-ordering that similarly emphasizes relevant content items 206, but does not also value preserving the initial ordering. Accordingly, the value of α for the order X and the order Y that indicates the importance of relative content items 206 in the orderings may be set to 1. Similarly, the value of β that indicates the importance of maintaining the original ordering may be set to a relatively high value of 0.5 for the order X, and may be set to a relatively low value of 0.05 for the order Y.

The columns labeled "Gain X" and "Gain Y" indicate the gain values 212 computed for each of the content items 175 identified in the Table 1. The gain values 212 may have been computed using preference scores 211 computed for each of the identified content items 175 using the values of α and β used for the orderings X and Y. The positions of the content items 175 shown in the columns labeled "Order X" and "Order Y" were determined based on the computed gain values 211 from the columns labeled "Gain X" and "Gain Y" respectively.

As shown, in both the ordering X and the ordering Y the position of the content item 175 titled "Association for Computational Linguistics" was changed from 6 to 1. This change is a result of the particular content item 175 being the only relevant content item 206, and the high value of α use in both orderings. However, because of the different values of β used in the orderings X and Y, how the positions of the irrelevant content items 207 are changed in the ordering X and the ordering Y are different. For example, because the value of β in X is relatively low, the positions of the irrelevant content items 207 are little changed from the initial ordering. In contrast, because the value of β in Y is relatively high, the positions of the irrelevant content items 207 show numerous changes including a re-ordering of the content items 175 that preceded the relevant content item 206 in the ordering.

Figure 3:
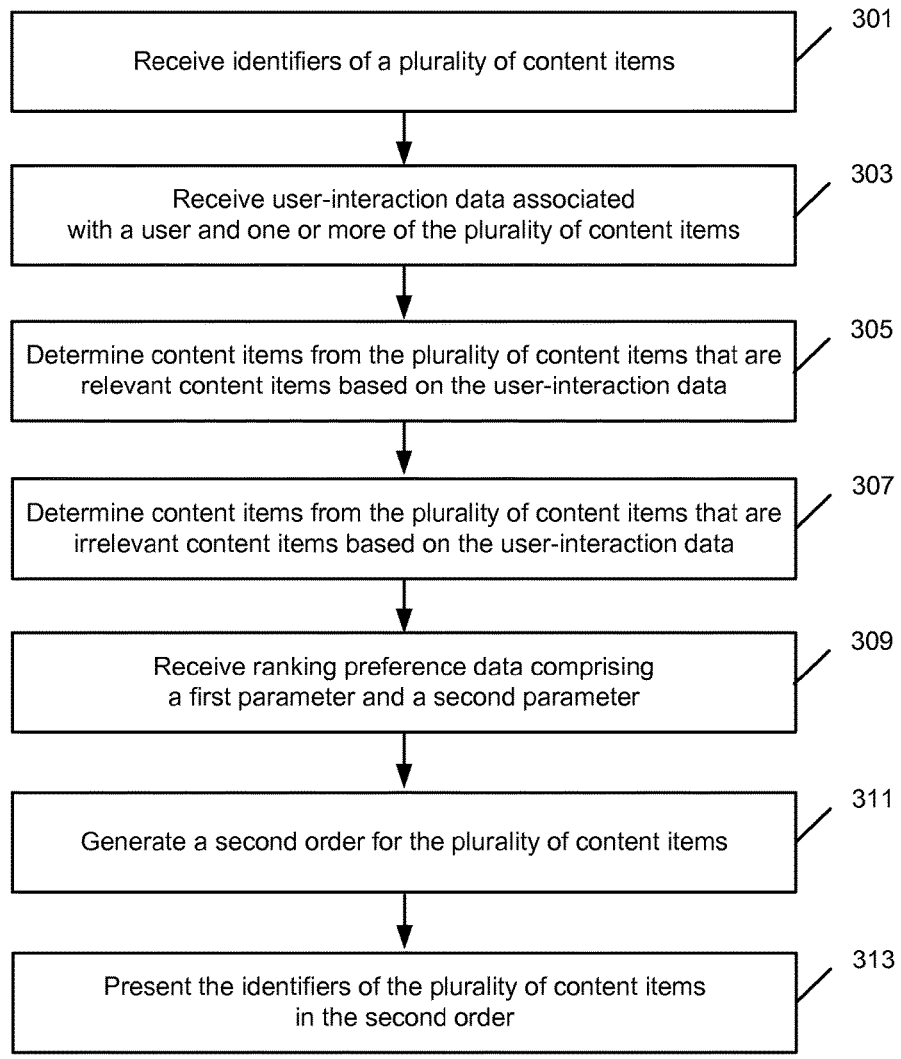
FIG. 3 is an operational flow of an implementation of a method for providing content item identifiers in an order based on user-interaction data.

FIG. 3 is an operational flow of an implementation of a method 300 for providing content item identifiers in an order based on user-interaction data. The method 300 may be implemented by the user-interaction ranker 163, for example.

At 301, identifiers of a plurality of content items are received. The identifiers of the plurality of content items may be the ranked content item identifiers 166 and may be received by the user-interaction ranker 163. The identified content items 175 may have been ranked by a content item identifiers 160 and may have been generated in response to a query 120 for content items 175 generated by a client device 110 on behalf of a user. The identified content items 175 may be ranked in a first order according to a generally applicable ranking method, and each content item 175 may have a position in the first order. The content items 175 may include web pages, documents, images, videos, or any of a variety of known content types.

At 303, user-interaction data associated with the user and one or more of the identified content items is received. The user-interaction data 165 may be data that indicates which of the content items 175 the user viewed and/or interacted with. For example, where the content items 175 are web pages, the user-interaction data 165 may include indicators of the web pages that the user previously selected and indicators of the amount of time that the user spent on each web page. Where the content items 175 are video or audio content items, the user-interaction data 165 may include indicators of the content items 175 that were viewed by the user, and indicators of satisfaction such as ratings given to the content items 175 by the user.

At 305, content items from the plurality of content items that are relevant content items are determined based on the user-interaction data 165. The relevant content items 206 may be determined by the relevant content item identifier 205. The relevant content items 206 may be those content items 175 that the user was previously satisfied with as indicated by the user-interaction data 165. For example, the relevant content items 206 may be the content items 175 identified by the ranked content item identifiers 166 that were previously clicked or selected by the user for the same query 120 or a different query 120.

At 307, content items from the plurality of content items that are irrelevant content items are determined based on the user-interaction data 165. The irrelevant content items 207 may be those content items 175 that the user was previously unsatisfied with as indicated by the user-interaction data 165. For example, where the content items 175 are web pages, the irrelevant content items 207 may be those content items 175 that were considered by the user but not clicked or selected. Alternatively, the irrelevant content items 207 may be any of the plurality of content items 175 that were not determined to be part of the relevant content items 206.

At 309, ranking preference data is received. The ranking preference data 215 may be received by the user-interaction ranker 163. The ranking preference data 215 may include a first parameter and a second parameter. The first parameter α may indicate a preference of the user for content items 175 that are part of the relevant content items 206. The second parameter β may indicate a preference of the user to maintain the first order of the ranked content item identifiers 166. Alternatively or additionally, the ranking preference data 215 may include a single parameter, and the other parameter may be fixed for all users, for example. The particular values of the first parameter and the second parameter may be set by a user or an administrator or may be determined through experimentation, depending on the implementation.

At 311, a second order for the plurality of content items is generated based on the relevant content items and the irrelevant content items. The second order may be determined by the user-interaction ranker 163 using the ranking preference data 215. The second order may be different than the first order.

Depending on the implementation, the user-interaction ranker 163 may generate the second order by calculating preference scores 211 for each content item 175 identified in the ranked content item identifiers 166. In particular, the user-interaction ranker 163, for each content item 175, may calculate a preference score 211 for the content item 175 with respect to each of the other content items 175 in the first order identified by the ranked content item identifiers 166. The preference scores 211 may be calculated using the first parameter and the second parameter according to the equation 1, for example. Other methods for calculating preference scores may be used.

The preference scores 211 calculated for each of the content items 175 identified by the ranked content item identifiers 166 may then be used by the user-interaction ranker 163 to determine a new position for some or all of the content items 175 identified by the ranked content item identifiers 166. For example, the content items 175 may be ranked by total preference scores 211, and the positions in the second order may be assigned to the content items 175 based on the ranking.

At 313, the identifiers of the plurality of content items are presented in the second order. The identifiers of the plurality of content items may be presented in the second order by the user-interaction ranker 163 to the user that provided the query 120 that the ranked content item identifiers 166 were generated in response to. The identifiers of the plurality of content items 175 in the second order may be presented as the user-interaction ranked content item identifiers 167. The ranked content item identifiers 166 may be links or URLs, for example.

Figure 4:
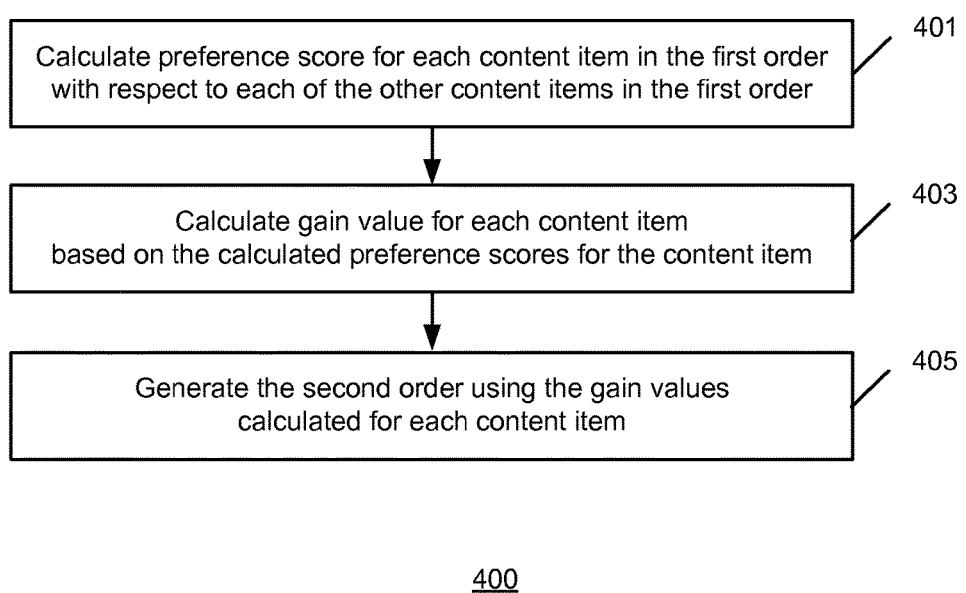
FIG. 4 is an operational flow of an implementation of a method for re-ordering content items based on calculated gain values.

FIG. 4 is an operational flow of an implementation of a method 400 for re-ordering content items based on calculated gain values. The method 400 may be implemented by the user-interaction ranker 163, for example.

At 401, a preference score is calculated for each content item with respect to each of the other content items. The preference scores 211 may be calculated for each content item 175 identified in the ranked content item identifiers 166 by the preference score engine 210 of the user-interaction ranker 163. Each preference score 211 for a first content item and a second content item may represent a preference for the first content item to be ranked higher than the second content item. The preference scores 211 calculated for each content item 175 identified in the ranked content item identifiers 166 may be calculated using the equation 1. Other equations may be used.

At 403, a gain value is computed for each content item based on the calculated preference scores for the content item. The gain values 212 may be calculated by the ranking engine 220 of the user-interaction ranker 163. The gain value 212 for a content item 175 may be a sum of all of the preference scores 211 computed for that content item 175.

At 405, the second order is generated using the gain values computed for each content item. The second order may be generated by the ranking engine 220 of the user-interaction ranker 163 by ordering the content items 175 according to calculated gain values 212. For example, the content item 175 with the highest calculated gain value 212 may receive the highest or top most position in the second order, and the content item 175 with the lowest calculated gain value 212 may receive the lowest or bottom most position in the second order. The identifiers of the content items 175 in the second order may be presented as the user-interaction ranked content item identifiers 167.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, eye-tracking device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, identifiers of a plurality of content items are received by a computing device. Each content item has a position in a first order of the plurality of content items. Content items from the plurality of content items that are relevant content items are determined by the computing device. Ranking preference data comprising a first parameter and a second parameter is received by the computing device. The first parameter indicates a preference of the user for content items that are relevant content items and the second parameter indicates a preference of the user to maintain the first order. A second order for the plurality of content items is generated using the ranking preference data by the computing device.

Implementations may include some or all of the following features. User-interaction data associated with the user and one or more of the plurality of content items may be received by the computing device. Determining content items from the plurality of content items that are relevant content items may include determining content items from the plurality of content items that are identified by the user-interaction data. The user-interaction data may be received from a search engine. The user-interaction data may include one or more of dwell-time and click data. The second order may be different than the first order. A ranking model may be trained using the second order. Generating a second order for the plurality of content items using the ranking preference data may include calculating a preference score for the content item with respect to each of the other content items in the first order based on the first parameter, the second parameter, and whether or not the content item was determined to be a relevant content item; and calculating a gain value for the content item based on a sum of the calculated preference scores for the content item. The second order may be generated using the gain value calculated for each content item.

In an implementation, identifiers of a plurality of content items are received by a computing device. Each content item has a position in a first order of the plurality of content items. User-interaction data associated with one or more users and one or more of the plurality of content items is received by the computing device. Content items from the plurality of content items that are relevant content items are determined based on the user-interaction data by the computing device. Content items from the plurality of content items that are irrelevant content items are determined based on the user-interaction data by the computing device. Ranking preference data associated with the user is received by the computing device. A second order for the plurality of content items is generated by the computing device based on the determined content items that are relevant content items, the determined content items that are irrelevant content items, and the ranking preference data.

Implementations may include some or all of the following features. The content items may include one or more of web pages, images, videos, or documents. A ranking model may be trained using the second order. The second order may be different than the first order. The user-interaction data may include one or more of dwell-time and click data. The ranking preference data may be specified by the one or more users. The ranking preference data may include a first parameter and a second parameter. The first parameter may indicate a preference of the user for content items that are relevant content items and the second parameter may indicate a preference of the one or more users to maintain the first order. Generating a second order for the plurality of content items based on the determined content items that are relevant content items, the determined content items that are irrelevant content items, and the ranking preference data may include calculating a preference score for the content item with respect to each of the other content items based on the first parameter, the second parameter; and whether the content item was determined to be a relevant content item or an irrelevant content item; calculating a gain value for the content item based on a sum of the calculated preference scores for the content item; and generating the second order using the gain calculated for each content item.

In an implementation, a system includes at least one computing device configured to generate query for a user, and a user-interaction ranker. The user-interaction ranker is configured to receive identifiers of a plurality of web pages, wherein each web page has a position in an a first order of the plurality of web pages and each web page is responsive to the generated query, determine web pages from the plurality of web pages that are relevant web pages, receive ranking preference data comprising a first parameter and a second parameter, wherein the first parameter indicates a preference of the user for web pages that are relevant web pages and the second parameter indicates a preference of the user to maintain the first order, and generate a second order for the plurality of web pages using the ranking preference data.

Implementations may include some of all of the following features. The user-interaction ranker may be further configured to receive user-interaction data associated with the user and one or more of the plurality of web pages. The user-interaction ranker configured to determine web pages from the plurality of web pages that are relevant web pages may include the user-interaction ranker configured to determine web pages from the plurality of web pages that are identified by the user-interaction data. The user-interaction ranker configured to generate a second order for the plurality of web pages using the ranking preference data may include the user-interaction ranker configured to: calculate a preference score for the web page with respect to each of the other web pages in the first order based on the first parameter, the second parameter, and whether or not the web page was determined to be a relevant web page; and calculate a gain value for the content item based on a sum of the calculated preference scores for the web page.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for re-ordering a plurality of content items using ranking preference data and user-interaction data comprising:

receiving identifiers of a plurality of content items by a computing device, wherein each content item has a position in a first order of the plurality of content items;

determining content items from the plurality of content items that are relevant content items by the computing device;

receiving ranking preference data comprising a first parameter and a second parameter by the computing device, wherein the first parameter indicates a preference of a user for content items that are relevant content items and wherein the second parameter indicates a preference of the user to maintain the first order such that for any two content items that have been determined to be in the same relevant or irrelevant class based on the user-interaction data, the priority for those content items remains the same in a second order as in the first order, wherein relative weights of the first parameter and the second parameter are selectable by the user, and wherein the ranking preference data further comprises a value that represents a preference to rank the content items based on interaction data associated with a different user;

calculating a gain value for each content item based on a sum of preference scores for that content item with respect to each of the other content items of the plurality of content items; and generating the second order for the plurality of content items using the ranking preference data and the gain value by the computing device.

2. The method of claim 1, further comprising receiving user-interaction data associated with the user and one or more of the plurality of content items by the computing device.

3. The method of claim 2, wherein determining content items from the plurality of content items that are relevant content items comprising determining content items from the plurality of content items that are identified by the user-interaction data.

4. The method of claim 2, wherein the user-interaction data is received from a search engine.

5. The method of claim 2, wherein the user-interaction data comprises one or more of dwell-time and click data.

6. The method of claim 1, wherein the second order is different than the first order.

7. The method of claim 1, further comprising training a ranking model using the second order.

8. The method of claim 1, wherein generating the second order for the plurality of content items using the ranking preference data comprises:

for each content item:
calculating a preference score for the content item with respect to each of the other content items in the first order based on the first parameter, the second parameter, and whether or not the content item was determined to be a relevant content item; and
calculating the gain value for the content item based on a sum of the calculated preference scores for the content item; and
generating the second order using the gain value calculated for each content item.

9. A method for re-ordering a plurality of content items using ranking preference data and user-interaction data comprising:

receiving identifiers of a plurality of content items by a computing device, wherein each content item has a position in a first order of the plurality of content items;

receiving user-interaction data associated with one or more users and one or more of the plurality of content items by the computing device;

determining content items from the plurality of content items that are relevant content items based on the user-interaction data by the computing device;

determining content items from the plurality of content items are irrelevant content items based on the user-interaction data by the computing device;

receiving ranking preference data associated with a user by the computing device, wherein the ranking preference data comprises a first parameter and a second parameter, wherein the first parameter indicates a preference of the one or more users for content items that are relevant content items and wherein the second parameter indicates a preference of the user to maintain the first order such that for any two content items that have been determined to be in the same relevant or irrelevant class based on the user-interaction data, the priority for those content items remains the same in a second order as in the first order, wherein relative weights of the first parameter and the second parameter are selectable by the user, and wherein the ranking preference data further comprises a value that represents a preference to rank the content items based on interaction data associated with a different user;

calculating a gain value for each content item based on a sum of preference scores for that content item with respect to each of the other content items of the plurality of content items; and generating the second order for the plurality of content items by the computing device based on the determined content items that are relevant content items, the determined content items that are irrelevant content items, the ranking preference data, and the gain value.

10. The method of claim 9, wherein the content items comprise one or more of web pages, images, videos, or documents.

11. The method of claim 9, further comprising training a ranking model using the second order.

12. The method of claim 9, wherein the second order is different than the first order.

13. The method of claim 9, wherein the user-interaction data comprises one or more of dwell-time and click data.

14. The method of claim 9, wherein the ranking preference data is specified by the one or more users.

15. The method of claim 9, wherein generating the second order for the plurality of content items based on the determined content items that are relevant content items, the determined content items that are irrelevant content items, and the ranking preference data comprises:

for each content item:
calculating a preference score for the content item with respect to each of the other content items based on the first parameter, the second parameter; and whether the content item was determined to be a relevant content item or an irrelevant content item;
calculating the gain value for the content item based on a sum of the calculated preference scores for the content item; and
generating the second order using the gain calculated for each content item.

16. A system for re-ordering a plurality of web pages using ranking preference data and user-interaction data comprising:

at least one computing device configured to generate a query for a user; and a user-interaction ranker configured to:
receive identifiers of a plurality of web pages, wherein each web page has a position in a first order of the plurality of web pages and each web page is responsive to the generated query;
determine web pages from the plurality of web pages that are relevant web pages;
receive ranking preference data comprising a first parameter and a second parameter, wherein the first parameter indicates a preference of the user for web pages that are relevant web pages and wherein the second parameter indicates a preference of the user to maintain the first order such that for any two web pages that have been determined to be in the same relevant or irrelevant class based on the user-interaction data, the priority for those web pages remains the same in a second order as in the first order, wherein relative weights of the first parameter and the second parameter are selectable by the user, and wherein the ranking preference data further comprises a value that represents a preference to rank the web pages based on interaction data associated with a different user;
calculate a gain value for each web page based on a sum of preference scores for that web page with respect to each of the other web pages of the plurality of web pages; and
generate the second order for the plurality of web pages using the ranking preference data and the gain value.

17. The system of claim 16, wherein the user-interaction ranker is further configured to receive user-interaction data associated with the user and one or more of the plurality of web pages.

18. The system of claim 16, wherein the user-interaction ranker configured to determine web pages from the plurality of web pages that are relevant web pages comprises the user-interaction ranker configured to determine web pages from the plurality of web pages that are identified by the user-interaction data.

19. The system of claim 16, wherein the user-interaction ranker configured to generate the second order for the plurality of web pages using the ranking preference data comprises the user-interaction ranker configured to:
for each web page:
calculate a preference score for the web page with respect to each of the other web pages in the first order based on the first parameter, the second parameter, and whether or not the web page was determined to be a relevant web page; and
calculate the gain value for the web page based on a sum of the calculated preference scores for the web page; and
generate the second order using the gain value calculated for each web page.

* * * * *